(No Model.)

J. S. COE.
SELF REVERSING CHECK VALVE.

No. 578,481. Patented Mar. 9, 1897.

Witnesses:—
M. E. Fletcher.
John N. Tilly.

Inventor
John S. Coe
by attorneys
Brown & Seward

UNITED STATES PATENT OFFICE.

JOHN S. COE, OF PATERSON, NEW JERSEY.

SELF-REVERSING CHECK-VALVE.

SPECIFICATION forming part of Letters Patent No. 578,481, dated March 9, 1897.

Application filed September 2, 1896. Serial No. 604,606. (No model.)

*To all whom it may concern:*

Be it known that I, JOHN S. COE, of Paterson, in the county of Passaic and State of New Jersey, have invented a new and Improved Self-Reversing Check-Valve, of which the following is a specification.

The object of this invention is to provide a valve for the purpose of effecting automatically the opening and closing of a passage or conduit in such manner that the said passage or conduit may be open to the passage or flow of water or other fluid through it in either of two directions while it is closed to or checks such passage or flow in the other direction.

Figure 1:
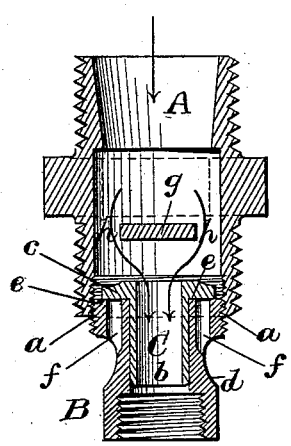
Figure 3:
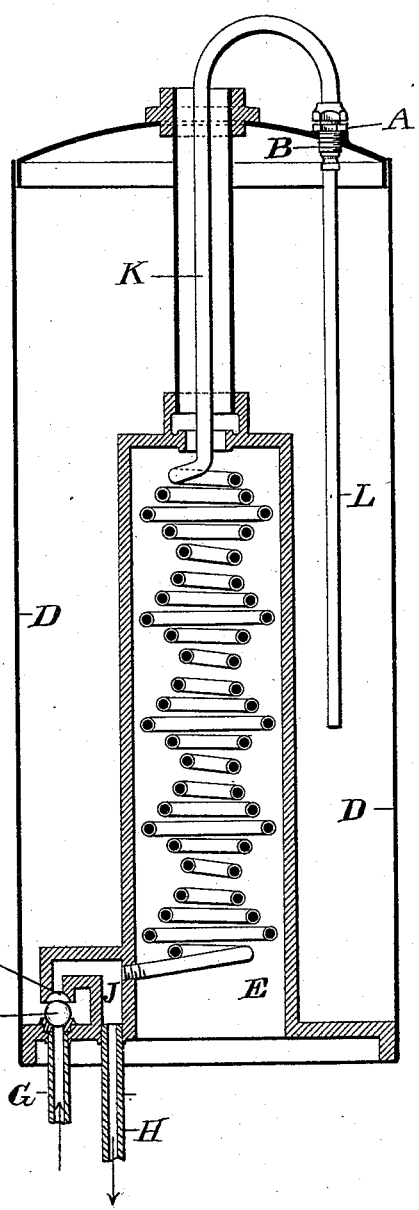
Figure 2:
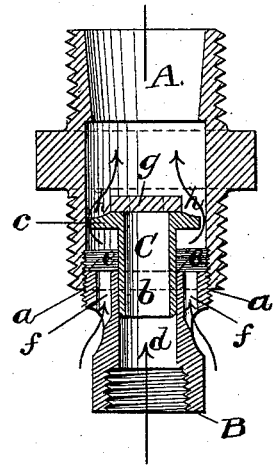

Figures 1 and 2 represent in central vertical section an automatically self-reversing valve embodying my invention, Fig. 1 representing the valve as open to the flow of the fluid in a downward direction, and Fig. 2 representing the valve as open to the flow in an upward direction. Fig. 3 represents a vertical section of a water-heating apparatus or boiler illustrating a practical application of my invention.

Similar letters of reference designate corresponding parts in all the figures.

Referring first to Figs. 1 and 2, A B designate a casing made of two parts A and B, separable for the introduction of the valve C. This separability may be provided for in any suitable manner, but it is shown as provided for by screw-threading the parts and screwing them together, as indicated at $a$. The said casing is open at the top and bottom. The valve C, which has the general form of a puppet-valve, but is hollow throughout and so has a passage directly through it, consists of a central tube or hollow stem $b$, around the exterior of the upper part of which is a flange $c$. The said stem $b$ is fitted closely, but to work freely, in a central bore $d$ in the lower part of the valve-casing, the upper end of which casing forms an annular valve-seat $e$ for the flange $c$ of the valve. In this seat $e$ there are openings $f$, leading through the sides of the part B of the casing. Across the upper part A of the casing there is provided a stationary bar or plate $g$, the lower face of which serves as a seat for the upper end or crown of the valve, the two valve-seats thus facing each other. The seat thus constituted by the said bar or plate $g$ is wide enough to cover and close the passage through the hollow valve-stem, as shown in Fig. 2, but it has on opposite sides of it a free passage, as shown at $h$ in Figs. 1 and 2, for the flow or circulation of the water or other fluid. The flange $c$ of the valve is sufficiently smaller externally than the interior of the part A of the valve-casing for the free flow of water around the said flange.

The operation of this valve is as follows: If the pressure above the valve is sufficiently greater than that below it to raise the valve, the flange $c$ is thereby held to the seat $e$, as shown in Fig. 1, and the openings $ff$ in the said seat are closed, but a free downward passage is provided through the passages $h$ at the sides of the seat $g$ and through the hollow stem $b$ of the valve C, as indicated by the arrows shown in said figure. If the pressure is greater below than above the valve, the said pressure acting through the openings $f$ in the valve-seat $e$ against the bottom of the flange $c$ of the valve and also through the bore $d$ against the bottom of the valve-stem forces the valve upward against the seat $g$, as shown in Fig. 2, and a free upward pressure is provided through the openings $f$ around the flange of the valve and at the sides of the seat $g$, as indicated by the arrows in that figure.

The water-heating apparatus illustrated in Fig. 3 to represent a practical application of my invention is the subject of my United States Patent No. 555,675, dated March 3, 1896. In this apparatus D designates a tank constituting the body of a boiler such as is employed for heating water for domestic use and is always intended to be kept filled with water by hydraulic pressure. E is a heating-chamber to be heated by any convenient means, and F is a water-heating coil within the said chamber. The water is introduced into the boiler through a pipe G and drawn off through a pipe H. An automatic valve I is placed between the supply-pipe G and a box J, through which the water is admitted from the tank D to the heating-coil F. The upper end of the coil communicates by a pipe K with the upper part of the tank. At all times but when water is being drawn off the circulation is intended to be from the tank D through the box J into the heating-coil, upward through said coil, and thence through the pipe K to the top of the tank D, thence downward into the latter; but when water is drawn from the boiler by the pipe H the circulation through the pipe K and coil is reversed, the valve I being caused by the draft of the water to rise to its seat $i$ at the entrance to the box J and so cut off the lower end of the coil from the tank, the water then flowing from the tank through the pipe K and downward through the coil to the box J and pipe H and fresh water entering the tank through the pipe G. When the pipe K terminates at the top of the tank and there is no valve at the connection of the said pipe with the tank, the circulation upward through the coil to the tank is sometimes seriously obstructed by the resistance of the colder water in the tank to the descent into it of the hotter water from the coil, but by placing the valve which I have hereinabove described as my invention at the connection of the pipe K with the tank and attaching to the bottom of the valve-casing a pipe L, projecting downward into the tank, so as to deliver the hotter water from the coil into the lower part of the latter, the said hotter water will issue freely from the said pipe L, owing to its tendency to rise through the colder water in the said tank.

It will be understood from the description which I have given of the valve itself that it provides for the circulation of the water through the coil in either direction and at the same time checks or prevents its flow in the other direction.

What I claim as my invention is—

1. The combination of a valve-casing having in it two opposite valve-seats, and a puppet-valve which has an opening directly through it, the flange of the said valve seating against one of said seats to check the flow through the valve-casing in one direction only and the crown of the said valve seating against the other of said seats to check the flow in the other direction only, substantially as herein described.

2. The combination with a valve-casing containing two opposite valve-seats one of which is annular with central and side openings and the other of which is arranged transversely to the casing but has passages at its sides, of a hollow puppet-valve which has a passage directly through it, the stem of said valve fitting the central opening in said annular seat and the flange of said valve seating against said annular seat for controlling the side openings therein, and the crown of the said valve seating against said transversely-arranged seat for closing the passage through the valve itself, substantially as herein described.

JOHN S. COE.

Witnesses:
 FREDK. HAYNES,
 LIDA M. EGBERT.